US009282141B2

(12) United States Patent
Liu et al.

(10) Patent No.: US 9,282,141 B2
(45) Date of Patent: Mar. 8, 2016

(54) METHOD AND SYSTEM FOR LOADING FILE IN WEBGAME

(71) Applicant: Tencent Technology (Shenzhen) Company Limited, Shenzhen (Guangdong) (CN)

(72) Inventors: Gang Liu, Shenzhen (CN); Yan Huang, Shenzhen (CN); Guowei Fu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 238 days.

(21) Appl. No.: 14/235,386

(22) PCT Filed: May 7, 2013

(86) PCT No.: PCT/CN2013/075280
§ 371 (c)(1),
(2) Date: Jan. 27, 2014

(87) PCT Pub. No.: WO2013/170715
PCT Pub. Date: Nov. 21, 2013

(65) Prior Publication Data
US 2014/0156810 A1 Jun. 5, 2014

(30) Foreign Application Priority Data

May 15, 2012 (CN) .......................... 2012 1 0149315

(51) Int. Cl.
G06F 15/173 (2006.01)
H04L 29/08 (2006.01)
(Continued)

(52) U.S. Cl.
CPC .............. *H04L 67/06* (2013.01); *G06F 9/5033* (2013.01); *G06F 17/30902* (2013.01); *H04L 67/104* (2013.01); *H04L 67/2814* (2013.01); *H04L 67/303* (2013.01)

(58) Field of Classification Search
CPC ............................ G06F 9/5033; H04L 67/104
USPC .......................................... 709/226, 239, 242
See application file for complete search history.

(56) References Cited

U.S. PATENT DOCUMENTS 8,024,396 B2 * 9/2011 Sedukhin .............. G06F 9/5061
709/201
8,752,092 B2 6/2014 Weeks
(Continued)

FOREIGN PATENT DOCUMENTS

CN 101166190 A 4/2008
CN 101184091 A 5/2008
(Continued)

OTHER PUBLICATIONS

Later publication of revised version of International Search Report (A9 36/2014) issued in PCT/CN2013/074647, mailed Apr. 9, 2014, 5 pages.
(Continued)

*Primary Examiner* — Hieu Hoang
(74) *Attorney, Agent, or Firm* — Faegre Baker Daniels LLP

(57) ABSTRACT

The present invention provides a method and a system for loading a file. The method includes: a browser sends a pre-download request to a pre-publish server beforehand, receives a download link fed back by the pre-publish server, downloads a file from a data source server through the download link, and sends a first file identifier of the pre-downloaded file and a user terminal address of a user terminal that runs the browser to a query server for storing. The browser receives a load instruction that carries a second file identifier of a file, and queries whether the file is stored locally, if the file is stored locally, reads the file locally, if the file is not stored locally, sends the load instruction to the query server, receives a user terminal address returned by the query server, sends the load instruction to a user terminal corresponding to the user terminal address according to the received user terminal address, and receives a file fed back by the user terminal.

19 Claims, 3 Drawing Sheets

(51) Int. Cl.
　　　*G06F 9/50*　　　(2006.01)
　　　*G06F 17/30*　　(2006.01)

(56) References Cited

U.S. PATENT DOCUMENTS

| | | | |
|---|---|---|---|
| 2003/0208540 A1* | 11/2003 | Kawahara | G06F 9/5033 709/205 |
| 2003/0217171 A1* | 11/2003 | Von Stuermer | G11B 27/036 709/231 |
| 2003/0225796 A1 | 12/2003 | Matsubara | |
| 2004/0122909 A1 | 6/2004 | Saika | |
| 2007/0204057 A1 | 8/2007 | Shaver et al. | |
| 2007/0237133 A1* | 10/2007 | Woods | G06Q 30/02 370/352 |
| 2009/0288127 A1 | 11/2009 | Corson et al. | |
| 2009/0298582 A1 | 12/2009 | Dempsky et al. | |
| 2009/0300204 A1 | 12/2009 | Zhang et al. | |
| 2010/0142447 A1* | 6/2010 | Schlicht | H04W 4/20 370/328 |
| 2010/0199312 A1 | 8/2010 | Chang et al. | |
| 2011/0169913 A1 | 7/2011 | Karaoguz et al. | |
| 2013/0167137 A1* | 6/2013 | Bansod | G06F 8/61 717/175 |
| 2014/0165119 A1 | 6/2014 | Liu et al. | |

FOREIGN PATENT DOCUMENTS

| | | |
|---|---|---|
| CN | 101945278 A | 1/2011 |
| CN | 101977228 A | 2/2011 |
| CN | 102055964 A | 5/2011 |
| CN | 102118406 A | 7/2011 |
| CN | 101674261 B | 9/2011 |
| CN | 102387220 A | 3/2012 |
| CN | 102447688 A | 5/2012 |
| FR | 2918241 A1 | 1/2009 |
| JP | 2009093212 A | 4/2009 |
| KR | 2002009785 A | 2/2002 |
| KR | 1020090055903 A | 6/2009 |
| WO | 2013159703 A1 | 10/2013 |

OTHER PUBLICATIONS

International Search Report issued in PCT/CN2013/072738, mailed Jun. 27, 2013, 3 pages.
International Search Report issued in PCT/CN2013/074647, mailed Aug. 1, 2013, 5 pages.
International Search Report issued in PCT/CN2013/075280, mailed Aug. 15, 2013, 4 pages.
Written Opinion issued in PCT/CN2013/075280, mailed Aug. 15, 2013, 5 pages.

* cited by examiner

US 9,282,141 B2

METHOD AND SYSTEM FOR LOADING FILE IN WEBGAME

CROSS-REFERENCE TO RELATED APPLICATIONS

This application is a national phase application of PCT Application No. PCT/CN2013/075280, internationally filed May 7, 2013, which claims priority to Chinese Patent Application No. 201210149315.3, filed with the Chinese Patent Office on May 15, 2012, and entitled "METHOD AND SYSTEM FOR LOADING FILE IN WEBGAME", both of which are herein incorporated by reference in their entirety.

FIELD OF THE TECHNOLOGY

The present disclosure relates to network information transmission technologies, and in particular, to a method and a system for loading a file in a webgame.

BACKGROUND

Webgame is also called web game or no-client web game, which are abbreviated as webgame. A webgame is played by using a browser without the need of downloading a client program. The user can participate in the game anywhere and anytime on any computer connected with the Internet.

In the webgame process, files usually need to be loaded. The method for loading a file in the prior art includes:

a browser receives a load instruction which is input by a user and includes a file identifier of a file to be loaded, and sends the load instruction to a webgame server which stores files corresponding to respective file identifiers; the server receives the load instruction, retrieves a file corresponding to the file identifier of the file to be loaded, and sends the file to the browser.

The files requested by the user to be loaded include content files and update files. The content files include audio file, video file, image file, text file, and so on. Taking the art design in the webgame as an example, the content files for the art design include many types of files about terrain, buildings, plants, characters, animals, animation, close-up, interfaces, and so on. After obtaining such content files, the browser displays specific background images, character shape, animal shape, and so on. The webgame needs to be updated constantly for improvements. To update the webgame, the user clicks an update button on the browser to trigger the browser to obtain update files from the webgame server.

With the rapid development of webgames, functions of the games are increasingly diverse, and more and more files need to be loaded, which brings a huge bandwidth pressure on webgame servers.

SUMMARY

The present disclosure provides a method for loading a file in a webgame, which can relieve bandwidth pressure and improve the speed of loading files and the transmission efficiency.

The present disclosure provides a system for loading a file in a webgame, which can relieve bandwidth pressure and improve the speed of loading files and the transmission efficiency.

A method for loading a file in a webgame includes:

sending, by a browser, a pre-download request to a pre-publish server beforehand, receiving a download link fed back by the pre-publish server, downloading a file from a data source server through the download link, and sending a first file identifier of the pre-downloaded file and a user terminal address of a user terminal that runs the browser to a query server for storing;

receiving, by the browser, a load instruction that carries a second file identifier of a file to be loaded from a user, and querying whether the file to be loaded is stored locally, and if the file to be loaded is stored locally, reading the file locally, and if the file to be loaded is not stored locally, sending the load instruction to the query server, and receiving a user terminal address returned by the query server; and sending, by the browser, the load instruction to a user terminal corresponding to the user terminal address according to the received user terminal address, and receiving the file fed back by the user terminal.

A system for loading a file in a webgame includes a browser, a pre-publish server, a data source server, and a query server.

The browser is configured to send a pre-download request to the pre-publish server beforehand, wherein the pre-download request carries user terminal information, receive a download link fed back by the pre-publish server, download a file from the data source server through the download link; and send a first file identifier of the pre-downloaded file and a user terminal address of a user terminal that runs the browser to the query server for storing. The browser configured to receive a load instruction that carries a second file identifier of a file to be loaded from a user, and query whether the file to be loaded is stored locally, and if the file to be loaded is stored locally, read the file locally, and if the file to be loaded is not stored locally, send the load instruction to the query server, receive a user terminal address returned by the query server, send the load instruction to a user terminal corresponding to the received user terminal address, and receive the file fed back by the user terminal Where, the first file identifier and the second file identifier can be the same or different file identifiers.

The data source server is configured to store webgame files;

The pre-publish server is configured to receive the pre-download request from the browser, and judge whether the user terminal information fulfills pre-download conditions, and, if the user terminal information fulfills the pre-download conditions, deliver the download link to the browser; and The query server is configured to receive the first file identifier of the pre-downloaded file and the user terminal address from the browser, store the user terminal address and the first file identifier of the pre-downloaded file, correlate the user terminal address to the first file identifier of the pre-downloaded file, receive from the browser the load instruction that carries the second file identifier of the file to be loaded, find the user terminal address corresponding to the second file identifier of the file to be loaded, and send the user terminal address to the browser. Where, the first file identifier and the second file identifier can be the same or different file identifiers.

As revealed in the foregoing solution, in the present disclosure, the browser downloads a file from the data source server beforehand, and sends a file identifier of the pre-downloaded file and an address of a user terminal that runs the browser to the query server for storing; when a file needs to be loaded and it is found that the file is not stored locally, the browser obtains a user terminal address corresponding to the file identifier of the file to be loaded from the query server, and requests the file from a user terminal indicated by the user terminal address. In this way, with the peer-to-peer (p2p, peer to peer) technology, the file transfer between the user terminal and the server changes to the file transfer between user terminal nodes, thereby relieving bandwidth pressure on the server side effectively and improving the speed of downloading files and the transmission efficiency. Further, the webgames have greater potentialities of becoming more sophisticated and more diverse, and the saved bandwidth resources are available for bearing the webgames that have more sophisticated styles and contents.

DETAILED DESCRIPTION

To make the objectives, technical solutions and advantages of the present disclosure more comprehensible, the following describes the present disclosure in detail with reference to embodiments and accompanying drawings.

Figure 1:
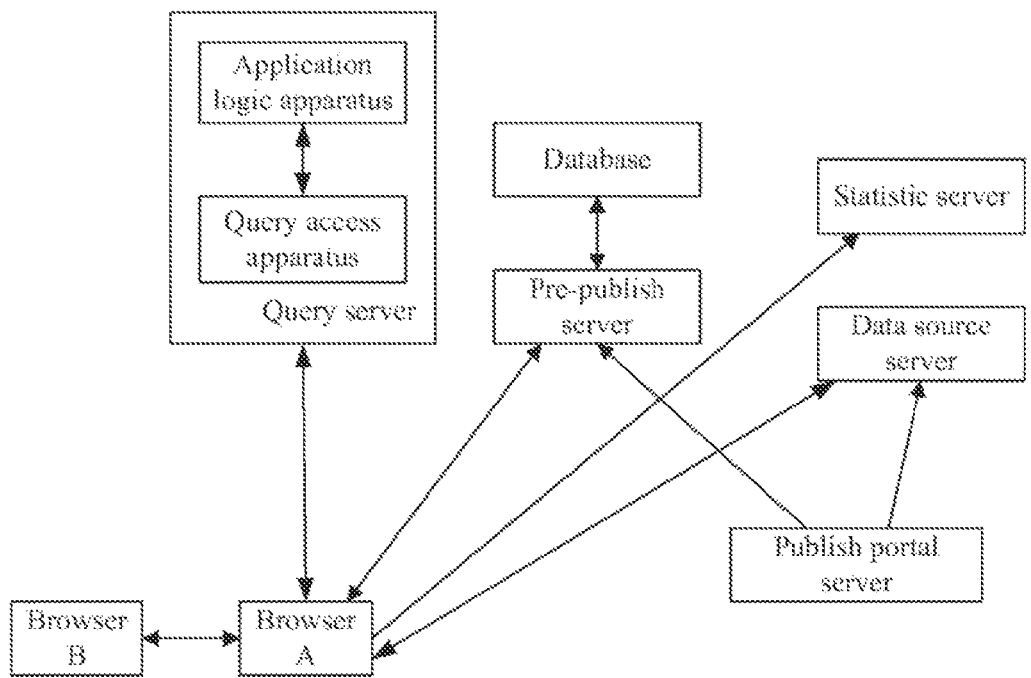
FIG. 1 is a schematic structural diagram of a system for loading a file in a webgame according to embodiments of the present disclosure.

By using a peer-to-peer (p2p) technology, the present disclosure lets webgame user terminals share files required by the game. FIG. 1 is a schematic structural diagram of a system for loading a file in a webgame according to an embodiment of the present disclosure. The system includes a browser A, and further includes a pre-publish server, a data source server and a query server on a network side.

The browser A is configured to: send a pre-download request to the pre-publish server beforehand, where the pre-download request carries a webgame version number of a user terminal that runs the browser and user terminal information; receive a download link fed back by the pre-publish server; download a file from the data source server through the download link; and send a first file identifier of the pre-downloaded file and a user terminal address of the user terminal to the query server for storing, where the address of the user terminal is an IP address and a port address of the user terminal. The browser A is configured to receive a load instruction that carries a second file identifier of a file to be loaded from a user, and query whether the file to be loaded is stored locally, and if the file to be loaded is stored locally, read the file locally, and if the file to be loaded is not stored locally, send the load instruction to the query server, receive a user terminal address returned by the query server, send the load instruction to a user terminal corresponding to the received user terminal address, and receive the file fed back by the user terminal Where, the first file identifier and the second file identifier can be the same or different file identifiers.

The data source server is configured to store webgame files.

The pre-publish server is configured to receive the pre-download request from the browser A, and judge whether the user terminal information fulfills pre-download conditions, and, if the user terminal information fulfills the pre-download conditions, deliver the download link to the browser A.

The query server is configured to receive the first file identifier of the pre-downloaded file and the user terminal address from the browser A, store the user terminal address and the first file identifier of the pre-downloaded file, correlate the user terminal address to the first file identifier of the pre-downloaded file, receive the load instruction from the browser A, wherein the load instruction carries the second file identifier of the file to be loaded, find a user terminal address corresponding to the second file identifier of the file to be loaded, and send the user terminal address to the browser A. If the query server stores no user terminal address corresponding to the second file identifier of the file to be loaded, the load instruction is ignored. Where, the first file identifier and the second file identifier can be the same or different file identifiers.

Specifically, when the user opens the browser A and opens a webgame main window, the browser A sends the pre-download request to the pre-publish server.

The pre-publish server stores description information of files required by the webgame, where the description information includes a mapping relationship between a download link and a file identifier of each of the files, and the file identifier may be specifically a hash value. The data source server stores the files required by the webgame, where the file identifier corresponds to the download link in a one-to-one relationship.

For example, the user terminal information is at least one of a size of free cache space and a network bandwidth value. The pre-download conditions are set in the pre-publish server as a basis of judging whether to issue a download link to the browser A. The pre-download conditions may be set as required, and may be that, for example, the network bandwidth value of the user terminal is greater than a first preset value and the free cache space of the user terminal is greater than a second preset value.

Optionally, the query server includes a query access apparatus and an application logic apparatus.

The query access apparatus is configured to: receive the first file identifier and the user terminal address from the browser A, and send them to the application logic apparatus for storing; receive a load instruction from the browser A, which carries the second file identifier of the file to be loaded, and transmit the load instruction to the application logic apparatus; receive the user terminal address returned by the application logic apparatus, and send it to the browser A.

The application logic apparatus is configured to: store the user terminal address and the first file identifier, correlate the user terminal address to the first file identifier, receive the load instruction from the query access apparatus, find the user terminal address corresponding to the second file identifier of the file to be loaded, and return it to the query access apparatus.

Optionally, the system further includes a publish portal server on the network side, configured to upload the webgame files to the data source server, and send the description information of the files to the pre-publish server for storing, where the description information includes the mapping relationship between a download link and a file identifier of each of the files.

Optionally, the pre-publish server includes a database for storing the description information of the files. The database may be set in the pre-publish server or may be set independent of the pre-publish server.

Optionally, the system further includes a statistic server on the network side.

The browser A is further configured to report load information that includes the first file identifier to the statistic server after sending the first file identifier and the user terminal address of the user terminal that runs the browser A to the query server for storing.

The statistic server is configured to receive the load information from the browser A, and make statistics of the load information.

Figure 2:
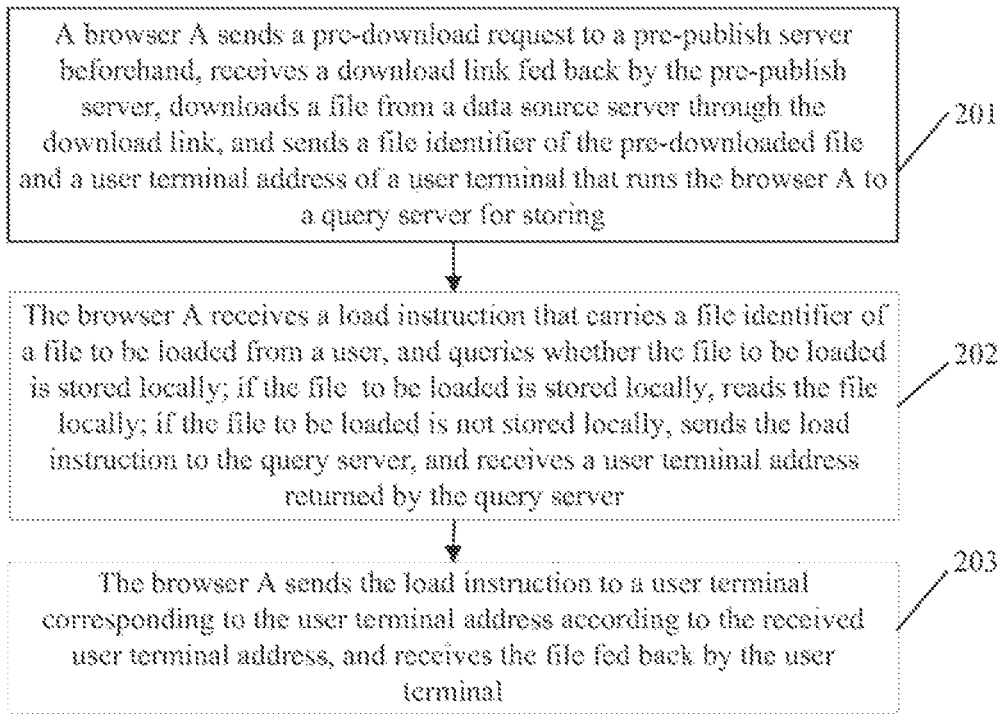
FIG. 2 is a flowchart of a method for loading a file in a webgame according to embodiments of the present disclosure.

The present disclosure further provides a method for loading a file based on the structure shown in FIG. 1, and FIG. 2 is a schematic flowchart of the method. The method includes the following steps:

Step 201: a browser A sends a pre-download request to a pre-publish server beforehand, receives a download link fed back by the pre-publish server, downloads a file from a data source server through the download link, and sends a first file identifier of the pre-downloaded file and a user terminal address of a user terminal that runs the browser A to a query server for storing.

When a user opens the browser A and opens a webgame main window, the browser A sends the pre-download request to the pre-publish server, where the pre-download request carries a webgame version number of the user terminal.

The pre-publish server stores description information of files required by a webgame corresponding to the webgame version number, where the description information includes a mapping relationship between a download link and a file identifier of each of the files, and the file identifier may be specifically a hash value. The data source server stores the files required by the webgame, where the file identifier corresponds to the download link in a one-to-one relationship. Before this step, an operator may directly upload the files and the description information to the data source server and the pre-publish server respectively, or the operator may use a publish portal server to upload the files and the description information to the data source server and the pre-publish server respectively.

Further, pre-download conditions may be set in the pre-publish server as a basis of judging whether to issue the download link to the browser A. Correspondingly, the pre-download request further carries user terminal information. After receiving the pre-download request sent by the browser A, the pre-publish server judges whether the user terminal information fulfills the pre-download conditions, and, if the user terminal information fulfills the pre-download conditions, delivers the download link to the browser A.

For example, the user terminal information is at least one of a size of free cache space and a network bandwidth value. The pre-download conditions may be set as required, and may be that, for example, the network bandwidth value of the user terminal is greater than a first preset value and the free cache space of the user terminal is greater than a second preset value.

Step 202: the browser A receives a load instruction that carries a second file identifier of a file to be loaded from the user, queries whether the file to be loaded is stored locally, and if the file to be loaded is stored locally, reads the file locally, and if the file to be loaded is not stored locally, sends the load instruction to the query server, and receives a user terminal address returned by the query server.

Specifically, the files to be loaded include content files and update files.

After the user opens the browser A, when a file needs to be loaded in the game process, the user sends to the browser A a load instruction that carries the second file identifier of the file to be loaded. For example, each game scenario respectively corresponds to an file identifier of a file to be loaded, and, when the game scenario needs to be changed, the user clicks a scenario change button to trigger a scenario change instruction so that the load instruction that carries the second file identifier of the file to be loaded is sent to the browser A; for another example, when a new version of the file is available, the user is prompted whether to update the file, and, if the user wants to update the file, the user clicks an update button to trigger an update instruction so that the load instruction that carries the second file identifier of the file to be loaded is sent to the browser A. In this case, the load instruction that carries the second file identifier of the file to be loaded is the update instruction that carries the file identifier of the file to be updated.

Step 203: the browser A sends the load instruction to a user terminal corresponding to the user terminal address according to the received user terminal address, and receives the file fed back by the user terminal.

In some embodiments, after receiving the file fed back by the user terminal corresponding to the user terminal address, the browser A sends the received file identifier and the user terminal address of the user terminal that runs the browser A to the query server for storing, so as to share the received file with other user terminals.

In some embodiments, to make statistics of the load-related information, in the process in FIG. 2, the browser A reports the load information to the statistic server. For example, in step 201, after sending the first file identifier and the user terminal address of the user terminal that runs the browser to the query server for storing, the browser A reports the load information to the statistic server. The load information includes the download link obtained from the pre-publish server, the corresponding first file identifier, file size, download time, and so on.

In some embodiments, a server issues a function module for implementing the file loading solution of the present disclosure to the browser, and the browser installs the function module to execute the file loading solution provided in the present disclosure. For a browser that supports an ActiveX component, the issued function module is an ActiveX function module; for a browser that supports a Flash technology, the issued function module is a Flash function plug-in. The browsers that support a Flash technology include: FireFox, Safari, IE, Chrome, Opera, and so on.

Figure 3:
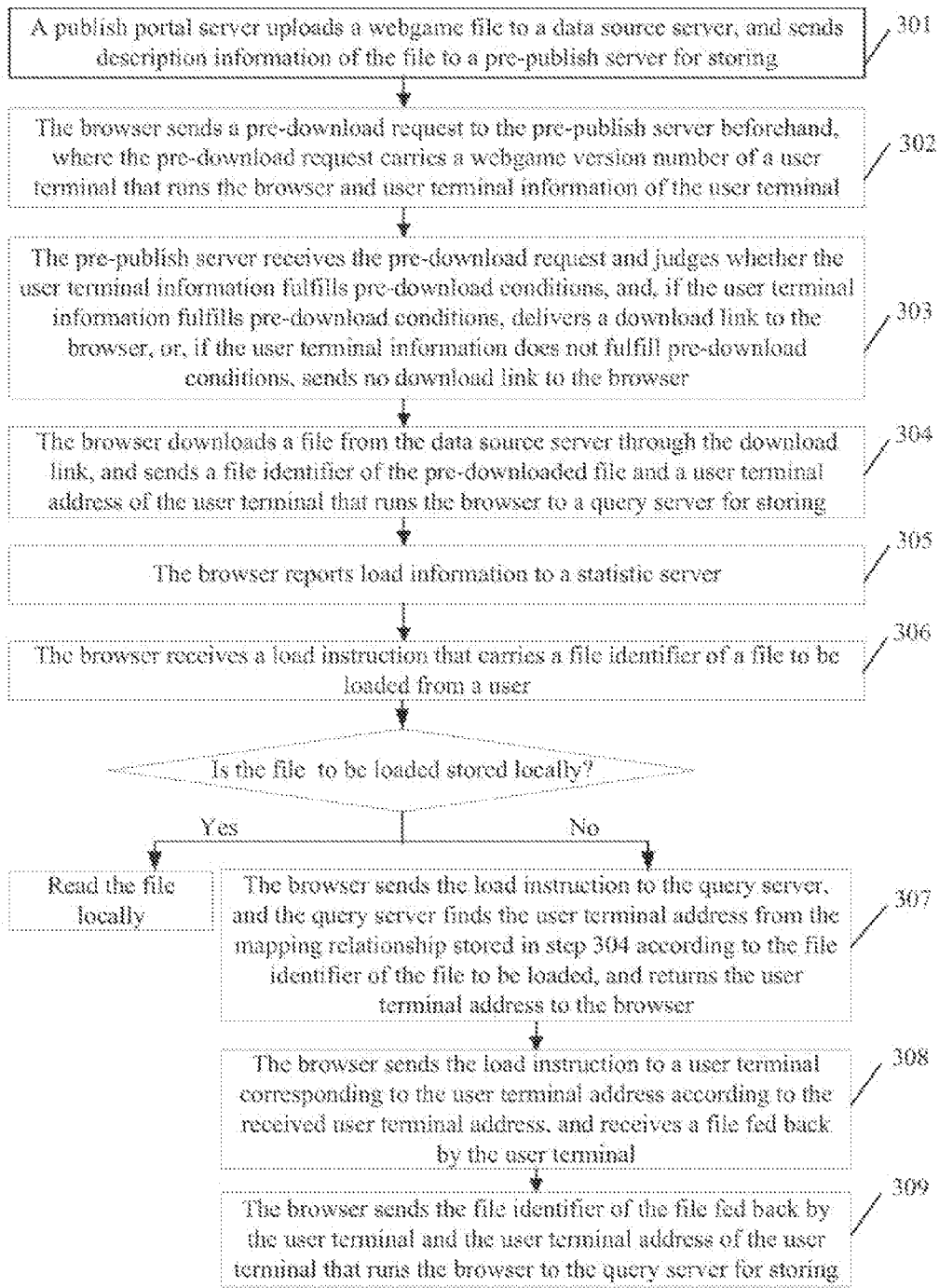
FIG. 3 is a flowchart of a method for loading a file in a webgame according to embodiments of the present disclosure.

FIG. 3 is a flowchart of a method for loading a file in a webgame according to embodiments of the present disclosure. The method includes the following steps:

Step 301: a publish portal server uploads a webgame file to a data source server, and sends description information of the file to a pre-publish server for storing, where the description information includes a mapping relationship between a download link and a file identifier of the file.

The publish portal server is a portal for uploading the file and the description information. Specifically, the uploading may be implemented through a managing page of web information.

Step 302: the browser sends a pre-download request to the pre-publish server beforehand, where the pre-download request carries a webgame version number of a user terminal that runs the browser and user terminal information of the user terminal.

Step 303: the pre-publish server receives the pre-download request and judges whether the user terminal information fulfills pre-download conditions, and, if the user terminal information fulfills pre-download conditions, delivers a download link to the browser, or, if the user terminal information does not fulfill pre-download conditions, sends no download link to the browser.

Step 304: the browser downloads a file from the data source server through the download link, and sends a first file identifier of the pre-downloaded file and a user terminal address of the user terminal that runs the browser to a query server for storing.

The query server stores a mapping relationship between the first file identifier and the user terminal address of the user terminal.

Step 305: the browser reports load information to a statistic server.

The load information includes: the download link obtained by the browser from the pre-publish server, the first file identifier, file size, download time, and so on. The statistic server can record the reported load information as a series of logs for future statistics and analysis.

Step 306: the browser receives a load instruction that carries a second file identifier of a file to be loaded from a user, queries whether the file to be loaded is stored locally, and if the file to be loaded is stored locally, reads the file locally and completes the process, and if the file to be loaded is not stored locally, performs step 307.

Step 307: the browser sends the load instruction to the query server, and the query server finds the user terminal address from the mapping relationship stored in step 304 according to the second file identifier of the file to be loaded, and returns the user terminal address to the browser.

In some embodiments, the query server sets an algorithm and a policy for selecting user terminal nodes, so as to feed back the user terminal address to the browser by sending a record request, where the record request is used to query file index information of registered terminals and the specific online state of the terminals, and the file index information includes the mapping relationship between the file identifier and the user terminal address. For example, the browsers that run the webgame report their registration states such as online state or offline state to the query server, and the query server records the state of each browser; after receiving a load instruction, the query server finds the user terminal address from the mapping relationship stored in step 304 according to the file identifier of the file to be loaded. If more than one user terminal address is found, one of the user terminal addresses in the online state is selected and fed back to the browser.

Step 308: the browser sends the load instruction to a user terminal corresponding to the user terminal address according to the received user terminal address, and receives a file fed back by the user terminal.

Step 309: the browser sends the second file identifier of the file fed back by the user terminal and the user terminal address of the user terminal that runs the browser to the query server for storing.

Embodiments of the present disclosure further provide a device for loading a file in a webgame. The device includes: a memory, configured to store computer readable instructions; and a processor, coupled with the memory. The processor is configured to execute the computer readable instructions stored in the memory, and is configured to execute various embodiments of the foregoing method for loading a file in a webgame. Embodiments of the present disclosure provide non-transitory computer or machine readable media, such as random access memory (RAM), read only memory (ROM), and disc storage devices, that store the computer readable instructions. When the processor executes the computer readable instructions, the machine provides embodiments of the foregoing method for loading a file in a webgame.

In the present disclosure, the p2p technology is used to share the files required by the game between webgame user terminals, thereby greatly reducing the peak bandwidth occupied in downloading content files or publishing an update, relieving the bandwidth pressure on the server side effectively, and improving the speed of downloading files and the transmission efficiency. Further, as webgames become more sophisticated and more diverse, the saved bandwidth resources are available for bearing the webgames that have more sophisticated styles and contents. Moreover, the connection and the transmission between the user terminal and the server transform to the connection and file transmission between user terminal nodes, thereby relieving connection pressure between the user terminal and the server and improving the effect of the connection and the download success rate.

The foregoing descriptions are embodiments of the present disclosure, but are not intended to limit the present disclosure. Any modifications, equivalent substitutions, and improvements made within the spirit and principles of the present disclosure shall fall within the protection scope of the present disclosure.

The invention claimed is:

1. A method for loading a file in a webgame, comprising:
sending, by a browser, a pre-download request to a pre-publish server beforehand, receiving a download link fed back by the pre-publish server, pre-downloading a file from a data source server through the download link, and sending a first file identifier of the pre-downloaded file and a user terminal address of a user terminal that runs the browser to a query server for storing;
receiving, by the browser, a load instruction that carries a second file identifier of a file to be loaded from a user, and querying whether the file to be loaded is stored locally, and if the file to be loaded is stored locally, reading the file locally, and if the file to be loaded is not stored locally, sending the load instruction to the query server, and receiving a user terminal address returned by the query server; and
sending, by the browser, the load instruction to a user terminal corresponding to the user terminal address according to the received user terminal address, and receiving the file fed back by the user terminal.

2. The method according to claim 1, wherein before sending, by the browser, the pre-download request to the pre-publish server beforehand, the method further comprises:
uploading, by a publish portal server, the webgame file to the data source server, and sending description information of the file to the pre-publish server for storing, wherein the description information comprises a mapping relationship between the download link and the first file identifier of the file.

3. The method according to claim 2, wherein the pre-download request carries user terminal information, and, after sending, by the browser, the pre-download request to the pre-publish server, the method further comprises:
judging, by the pre-publish server, whether the user terminal information fulfills pre-download conditions, and, if the user terminal information fulfills pre-download conditions, delivering the download link to the browser.

4. The method according to claim 3, wherein the user terminal information comprises at least one of a size of free cache space and a network bandwidth value.

5. The method according to claim 1, wherein after receiving, by the browser, the file fed back by the user terminal, the method further comprises:
sending, by the browser, the second file identifier of the file fed back by the user terminal and the user terminal address of the user terminal that runs the browser to the query server for storing.

6. The method according to claim 1, wherein after sending, by the browser, the first file identifier of the pre-downloaded file and the user terminal address of the user terminal that runs the browser to the query server for storing, the method further comprises:

reporting, by the browser, load information that comprises the first file identifier of the pre-downloaded file to a statistic server.

7. The method according to claim 1, wherein the pre-downloaded files and the files fed back by the user terminal comprise content files and update files.

8. A system for loading a file in a webgame, comprising a browser, a pre-publish server, a data source server, and a query server, wherein:
the browser is configured to: send a pre-download request to the pre-publish server beforehand, wherein the pre-download request carries user terminal information, receive a download link fed back by the pre-publish server, download a file from the data source server through the download link, and send a first file identifier of the pre-downloaded file and a user terminal address of a user terminal that runs the browser to the query server for storing, and the browser is further configured to receive a load instruction that carries a second file identifier of a file to be loaded from a user, query whether the file to be loaded is stored locally, and if the file to be loaded is stored locally, read the file locally, and if the file to be loaded is not stored locally, send the load instruction to the query server, receive a user terminal address returned by the query server; send the load instruction to a user terminal corresponding to the received user terminal address, and receive the file fed back by the user terminal;
the data source server is configured to store webgame files;
the pre-publish server is configured to receive the pre-download request from the browser, and judge whether the user terminal information fulfills pre-download conditions, and, if the user terminal information fulfills the pre-download conditions, deliver the download link to the browser; and
the query server is configured to receive the first file identifier of the pre-downloaded file and the user terminal address from the browser, store the first file identifier of the pre-downloaded file and the user terminal address, correlate the user terminal address to the first file identifier of the pre-downloaded file, receive from the browser the load instruction that carries the second file identifier of the file to be loaded, find a user terminal address corresponding to the second file identifier of the file to be loaded, and send the user terminal address to the browser.

9. The system according to claim 8, wherein:
the query server comprises a query access apparatus and an application logic apparatus;
the query access apparatus is configured to: receive the first file identifier and the user terminal address from the browser, and send them to the application logic apparatus for storing; receive the load instruction from the browser, and transmit the load instruction to the application logic apparatus; receive the user terminal address returned by the application logic apparatus, and send the user terminal address to the browser; and
the application logic apparatus is configured to store the user terminal address and the first file identifier, correlate the user terminal address to the first file identifier, receive the load instruction from the query access apparatus, find the user terminal address corresponding to the second file identifier of the file to be loaded, and return the user terminal address to the query access apparatus.

10. The system according to claim 8, wherein:
the system further comprises a publish portal server, configured to upload the webgame files to the data source server, and send description information of the files to the pre-publish server for storing, wherein the description information comprises a mapping relationship between the download link and the first file identifier of each of the files.

11. The system according to claim 10, wherein the pre-publish server comprises a database for storing the description information of the files.

12. The system according to claim 8, wherein:
the system further comprises a statistic server;
the browser is further configured to report load information that comprises the first file identifier to the statistic server after sending the first file identifier of the pre-downloaded file and the user terminal address of the user terminal that runs the browser to the query server for storing; and
the statistic server is configured to receive the load information from the browser, and make statistics of the load information.

13. The method according to claim 2, wherein the pre-downloaded files and the files fed back by the user terminal comprise content files and update files.

14. The method according to claim 3, wherein the pre-downloaded files and the files fed back by the user terminal comprise content files and update files.

15. The method according to claim 4, wherein the pre-downloaded files and the files fed back by the user terminal comprise content files and update files.

16. The method according to claim 5, wherein the pre-downloaded files and the files fed back by the user terminal comprise content files and update files.

17. The method according to claim 6, wherein the pre-downloaded files and the files fed back by the user terminal comprise content files and update files.

18. The system according to claim 9, wherein:
the system further comprises a statistic server;
the browser is further configured to report load information that comprises the first file identifier to the statistic server after sending the first file identifier of the pre-downloaded file and the user terminal address of the user terminal that runs the browser to the query server for storing; and
the statistic server is configured to receive the load information from the browser, and make statistics of the load information.

19. The system according to claim 10, wherein:
the system further comprises a statistic server;
the browser is further configured to report load information that comprises the first file identifier to the statistic server after sending the first file identifier of the pre-downloaded file and the user terminal address of the user terminal that runs the browser to the query server for storing; and
the statistic server is configured to receive the load information from the browser, and make statistics of the load information.

* * * * *